United States Patent
Lynnworth et al.

[15] 3,636,754
[45] Jan. 25, 1972

[54] ULTRASONIC PROFILE MEASURING APPARATUS

[72] Inventors: Lawrence C. Lynnworth, Waltham; Dana R. Patch; Edmund H. Carnevale, both of Beverly, all of Mass.

[73] Assignee: Parametrics, Inc., Waltham, Mass.

[22] Filed: July 16, 1970

[21] Appl. No.: 55,506

[52] U.S. Cl............................73/67.8 R, 73/194 V, 73/71.5
[51] Int. Cl..........................................................G01n 29/00
[58] Field of Search........................73/67.2, 67.5, 67.7, 67.8, 73/67.9, 194 A

[56] References Cited

UNITED STATES PATENTS 3,273,146   9/1966   Hurwitz....................................73/67.8
3,350,942   11/1967   Peltola.....................................73/67.8
3,580,058   5/1971   Lynnworth............................73/67.7

*Primary Examiner*—James J. Gill
*Assistant Examiner*—Arthur E. Korkosz
*Attorney*—Kenway, Jenney & Hildreth

[57] ABSTRACT

An ultrasonic measurement system for determining the profile in a fluid medium of an ambient condition, variations in which produce variations in ultrasonic transmission characteristics of sensors in the medium. An iterated series of identical equispaced ultrasonic discontinuities characterized by individual reflection coefficients no greater than 0.10, define the sensors. In one embodiment solid rods are employed; in another discrete reflectors positioned in the medium are used.

19 Claims, 12 Drawing Figures

PATENTED JAN 25 1972
3,636,754
SHEET 1 OF 3
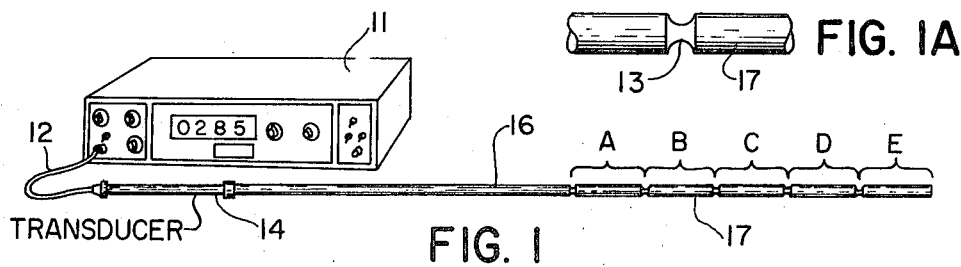
FIG. 1
FIG. 1A
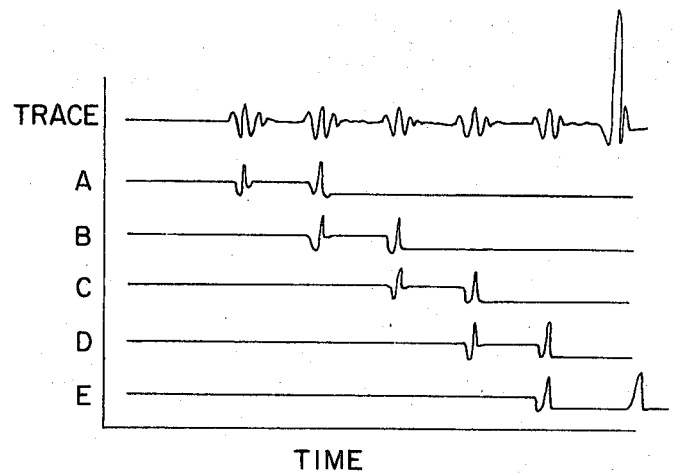
FIG. 2
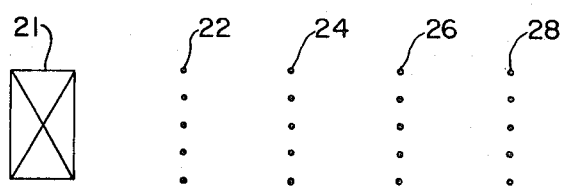
FIG. 3
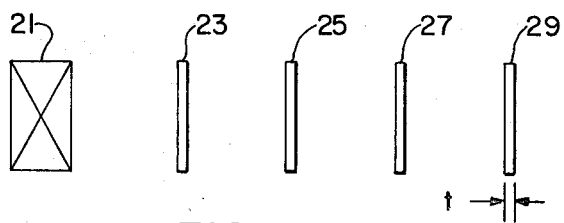
FIG. 4
INVENTORS
LAWRENCE C. LYNNWORTH
DANA R. PATCH
EDMUND H. CARNEVALE
BY
Kenway, Jenney & Hildreth
ATTORNEYS

TIME →

ULTRASONIC PROFILE MEASURING APPARATUS

FIELD OF THE INVENTION

This invention relates in general to ultrasonic testing utilizing pulse-echo or reflection measurement techniques and more particularly to an apparatus for measuring the ultrasonic transmission profile in a medium along a selected coordinate or dimension.

BACKGROUND OF THE INVENTION

In the field of ultrasonic testing it has been found that a number of physical characteristics of a material or medium may be determined by measuring the ultrasonic transmission characteristics over a predetermined path in the medium. The usefulness of ultrasonic measurement techniques for such determinations derives from the dependence of ultrasonic transmission characteristics on a number of other physical characteristics of the medium. Thus variations in density, pressure, temperature and composition of material will result in corresponding variations in the ultrasonic transmission characteristics of that material. This relationship applies not only to solids but also to fluids in both the liquid and gaseous states.

A number of relatively sophisticated techniques have been developed in order to perform satisfactory ultrasonic measurements for a variety of purposes in a variety of different media. For example, techniques and sensors for measuring the temperature in a number of different environments by means of ultrasonic transmission characteristics in a sensor material have been described in applications Ser. No. 730,713 filed May 21, 1968 and Ser. No. 730,872, filed May 21, 1968, now U.S. Pat. No. 3,580,058, both assigned to the assignee of this application. These techniques include the preparation of elongated sensor rods with a pair of predetermined discontinuities so that the average temperature along two sections of the sensor may be determined by measuring the time between reflection pulses from first and second discontinuities in the sensor and from the end of the sensor rod. Special types of circuitry have been developed which provide for interrogation of one or the other section of the sensor or the entire length of the sensor. For measurements of this type, involving two successive sections along a dimension, the measurement techniques have been limited to a solid sensor material within the environment and, as described in application Ser. No. 730,713, now U.S. Pat. No. 3,580,058, are formed with discontinuities which have sound pressure reflection coefficients in the order of 50 percent reflection from the combination of the first two discontinuities, so that the reflection pulse from the end of the sensor will be in the same order of magnitude. The conditions under which such techniques may apply are somewhat limited, because of the limitations of the solid probe and, additionally, preparation of the discontinuities in the materials must necessarily be carefully selected, since one of the discontinuities of concern is that between the end of the sensor and the environment and the relative ultrasonic impedances are therefore a function of the particular environment. In such configurations reverberations tend to limit the choice of dimensions and require some special response circuits.

One area of measurement which is important in a number of different applications is that of obtaining a "profile" of a particular characteristic along a coordinate or dimension in a medium, where the profile must include a number of discrete measurement intervals, usually in the order of five to 10 but in any event at least three. Such profiles are useful in diverse applications, for example, for measuring the temperature gradient within the liquid sodium coolant in a nuclear reactor or the temperature of the gas across the exhaust stream from a jet engine, or for measurements of temperature gradient across a flowing stream.

BRIEF SUMMARY OF THE INVENTION

Broadly speaking, the ultrasonic measurement system of this invention includes a number of ultrasonic discontinuities each having substantially the same ultrasonic reflection coefficient, and each spaced at equal intervals along a defined path in the medium to be measured. The discontinuities are selected such that the ratio of the impedances at the discontinuity produces a pressure reflection coefficient no greater than 0.10 and, as will be demonstrated, thereby provides for substantially equal sized reflection pulses. The ultrasonic wave generator is used to generate ultrasonic waves along the path, each wave being reflected from the equispaced, identical serially arranged discontinuities to produce a string of pulses, the time between successive pulses being indicative of the ultrasonic transmission characteristic of each discrete interval in the medium. The transmission characteristic may then be interpreted in terms of the environment characteristic, for example, temperature being measured. In one example, the discontinuities may be created in an extended solid sensor, such as a rod or wire. In other examples, the medium may be a fluid, either liquid or gas, and there may be positioned within it the discontinuities in the form of reflectors. These reflectors may be made of screens, thin films, perforated plates and the like. While the reflection coefficient is normally thought of as being a quantity derived from the acoustic impedances which give rise to the discontinuity, the effective reflection coefficient may also be one in which, although a higher reflection coefficient would be characteristic of the impedances, geometric considerations result in the reflection of only a portion of beam by the particular reflector and hence the effective overall reflection is much lower than would be predicted on the basis of the characteristic ultrasonic impedances. One example of this is the use of a mesh or screen reflector, in which the ultrasonic discontinuity is formed by the difference in impedances between a fluid medium and the solid material of the screen. On the basis of impedance calculations a relatively high reflection coefficient would be predicted. However, the effective reflection coefficient must take into account that a significant portion of the ultrasonic beam passes through the openings in the mesh ans hence does not interact with the screens. A variety of such configurations may be employed in embodiments of this invention.

It is only when the effective reflection coefficient, either directly from the acoustic impedances or from the combined effect of the geometry and characteristic impedance factors, is maintained at a value less than 0.10, that the discontinuities may be identical for a large number of reflectors, such as 10, and yet the relative reflection amplitudes vary only very slightly. Further, for such small reflectances, reverberations are very small compared to the echoes of interest. Thus even for a large number of iterated situations, the reflectors or the discontinuities may readily be produced and the electronics for determining the relative time between pulses can be arranged to respond to substantially a single value of pulse amplitude.

BRIEF DESCRIPTION OF THE DRAWINGS

With reference now to the drawings,

FIG. 1 is an illustration generally in perspective view of a measurement system constructed in accordance with the principles of this invention;

FIG. 1a is an enlarged view of a segment of the sensor element of FIG. 1;

FIG. 2 is an illustration in graphical form of the response of the transducer of FIG. 1 to an ultrasonic wave propagated down the sensor illustrated in the system of FIG. 1;

FIG. 3 is an illustration generally in schematic form of one embodiment of a sensor arrangement suitable for the practice of this invention;

FIG. 4 is an illustration generally in schematic form of another embodiment of a sensor arrangement suitable for use in the practice of this invention;

DESCRIPTION OF PREFERRED EMBODIMENTS

Figure 5:
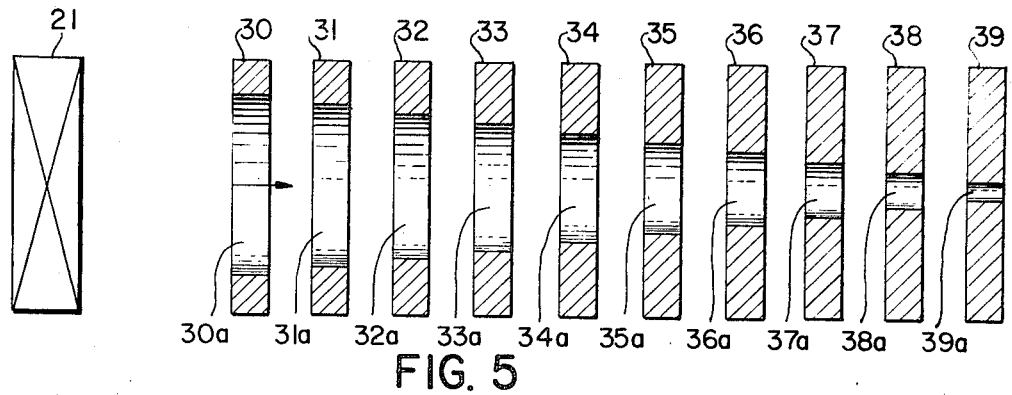
FIG. 5 is an illustration generally in diagrammatic form of still another embodiment of a sensor useful in the practice of this invention.

With reference now to FIG. 1 there is illustrated one embodiment of an ultrasonic measuring system. An ultrasonic transmitter-receiver-readout circuitry unit 11 is electrically coupled through cable 12 to an ultrasonic transducer 14, which is in turn acoustically coupled through lead-in element 16 to a multiple sector sensor 17. The operation of the system illustrated in FIG. 1 is one in which the ultrasonic transmitter unit 11 produces, at predetermined times, electrical drive signals to the transducer 14. The transducer responds to these drive signals by generating ultrasonic waves which are transmitted through the lead-in element 16 to the sensor 17. The sensor is formed of five identical serial segments, designated $A$, $B$, $C$, $D$ and $E$ with each segment being defined by a pair of acoustical discontinuities. In one example each acoustic discontinuity is formed of a narrowed, radius-grooved portion 13 of the sensor 17, as illustrated in FIG. 1a. Other types of lumped acoustic discontinuities, such as added mass or diameter increases may also be employed. The discontinuities are, however, subject to relatively stringent requirements. They must provide the same operation over the entire range of ambient condition, e.g., temperature to be measured. They must be small in dimension in the direction of propagation, much smaller than the wavelengths of the acoustic wave, so that cumulative distortion will not be introduced. The geometry and dimension must not be such as to produce scattered waves. Depending upon the particular reflection coefficient at each one of the discontinuities a portion of the ultrasonic wave transmitted to sensor 17 from lead-in element 16 is reflected back towards the transducer 14 and remainder is transmitted forward to the next succeeding discontinuity. This process takes place at each one of the discontinuities thus producing in response to each emitted pulse from the transducer 14 a series of reflection pulses of ultrasonic energy transmitted back toward the transducer 14.

The received ultrasonic reflection pulses are transformed at transducer 14 into electrical pulses which are retransmitted through cable 12 to the receiver portion of the ultrasonic transmitter-receiver-readout circuitry 11. At the receiver, the circuit measures the time between successive pulses and produces a series of output signals indicative of the time between each pair of reflection pulses, which signals are presented on the readout meter or recorder as indicative of the relative values, for each sector, of its ultrasonic transmission characteristic and hence of an environmental variable such as temperature being measured. The ultrasonic transmitter-receiver-readout circuit may be of the type described in U.S. Pat. No. 3,514,717. Such circuitry is available commercially under the trade name Panatherm Model 5010, from Panametrics, Inc., Waltham, Mass. Transducer 14 may be any one of a number of conventional transducer designs such as a magnetostrictive rod with a receiver coil and a transmitter coil wrapped around it. The sensor 17 can typically be formed of a long thin rod of acoustically conductive material such as rhenium, and, providing that its diameter is relatively thin compared to wavelength, may either be formed of a relatively substantial rod such as one with a 5 millimeter (0.2 inch) diameter or a relatively thin wire such as one having a 0.05 millimeter (0.002 inch) diameter. In order to make independent determinations of the ultrasonic transmission characteristic of each one of the sectors $A$, $B$, $C$, $D$ and $E$, usable (i.e., clear, noninterfering) reflection pulses must be generated from each one of the discontinuities. If the discontinuities are formed such that the reflection is the same, then the sound pressure reflection coefficient $R$ at the front of each sensor may be expressed as, $$R+r-1/r+1,$$

where $r$ (the ratio of wave impedances on either side of the boundary) $=Z_1/Z_0=Z_2/Z_1=Z_N/Z_{N-1}$.

The corresponding sound pressure transmission coefficient is, $$T=2r/r+1.$$

Continuity of pressure across these boundaries between sectors in the sensor is expressed by, $$1+R=T.$$

The expressions above for $R$ and $T$ coefficients apply for wave propagation in the direction from a medium having an impedance $Z_0$ toward that having an impedance $Z_1$. For waves being transmitted in the opposite direction, the impedance ratio $r'$ becomes the reciprocal of the ratio $r$ and the reflection coefficient $R'$ becomes the negative of its previous value $R$. The transmission coefficient $T'$ changes correspondingly:

$$T'=1+R'=1-R=2/(r+1).$$

In a specific numeral example, if the impedance ratio $r=11/9=1.2222$, then the reflection coefficient $T=0.10$ and the transmission coefficient $T=1.10$. Where, as in FIG. 1, the discontinuities are symmetrical, then for waves traveling in the opposite direction the reflection coefficients are the same. If, however, the discontinuities are asymmetrical, such as where the discontinuity is produced by a difference in diameter from one segment to the next, the sign of the reflection coefficient reverses with direction and $$R'=-R;$$

As will be discussed in connection with the description of FIGS. 8 and 9, this reversal in polarity may be used to advantage in a sensor employing a centrally located transducer. For a sensor having these relative values of acoustic impedance, the relative amplitude of reflection pulses from sensor segments $A$, $B$, $C$, $D$ and $E$ would be, to a first order approximation, $A=100$ $B=99$ $C=98$ $D=97$ $E=96$ We may note that when $R=0.1$, the fraction of incident energy reflected from such small discontinuities, proportional to $R^2$, is only 1 percent. When $R=0.2$, $R^2=4$ percent. If it is assumed that attenuation is negligible and that reverberations are negligible, then the echo amplitudes as a function of the echo number $N$ may be expressed as, $$RT^N(T')^N$$

If the end of the sensor is terminated in an effectively open or short acoustic circuit, the end echo will be proportional to $$\pm T^N(T')^N$$

The reverberations in the sensors may be neglected provided that the reflection coefficient $R$ is sufficiently small, a suitable value being less than 0.10. Since the reverberations may be neglected, the lead-in element 16 may have a length less than the total cumulative length of the sensor sections. The signal to noise ratio calculated on the basis of a sensor echo amplitude ratio to the first reverberation in the previous sensor is approximately $1/R^2$. Thus if $R$ is equal or less than 0.10 the signal to noise ratio will be approximately 100. In practice this means that not only may the acoustic discontinuities forming each discrete segment of the sensor system be made identical, but also the length of the sensor between discontinuities may be made the same. Under these conditions, not only are the reflection pulse amplitudes substantially uniform, but also since the sensor length segments are of equal length, a direct conversion from ultrasonic transmission time to the environmental characteristic being determined, for example, temperature, may be carried out independently of which segment of the sensor the transmission time is measured for.

In FIG. 2 oscillogram traces illustrate, as a function of time, the electrical signals generated by the transducer 14 in response to an ultrasonic wave transmitted along the sensor 17. The reflection pulses in the initial or upper trace represent reflection pulses from a single transmitted ultrasonic wave for each sector $A$, $B$, $C$, $D$ and $E$ and the time between each of the peaks would be indicative of the temperature at that portion of the sensor. The remainder of the traces are groups of pedestals that would be produced if the electronic circuitry were employed to make separate determinations of the temperature for each successively selected sector as defined by successively selected pair of discontinuities.

While the solid sensors illustrated above may be employed in a fluid medium, such as in the liquid sodium coolant in a fast breeder reactor, there are a number of situations in which it would not be feasible to use such a continuous solid member. In FIGS. 3 through 7 there are illustrated a number of sensor configurations in which reflectors are positioned at discrete intervals within the fluid medium itself. In this arrangement the ultrasonic wave is transmitted through the medium and along a path which includes the sensors.

In FIG. 3 there is illustrated schematically an arrangement which includes an ultrasonic transducer 21 and a series of four screens 22, 24, 26 and 28, which may be disks or rectangles of fine mesh positioned within the fluid medium. The effective reflection coefficient of such an arrangement will depend, not only on the relative acoustic impedance of the material forming the screen and the fluid medium, but also on the geometric cross section for interaction of the screen with the emitted ultrasonic wave. Thus ultrasonic energy which does not impinge upon the solid mesh, but rather passes through the openings in the mesh, will not be reflected and is therefore available for reflection at the next sequential one of the screen reflectors. If the mesh is reasonably fine or if a spherical ultrasonic wave front is employed, there should not be any significant collimation effect by the sequential screens, so that the effective reflections from the third and fourth reflectors 26 and 28 should be substantially the same as the reflection from the earlier screens 22 and 24.

A similar principle is applied in the embodiment illustrated in FIG. 4 in which the ultrasonic transducer 21 emits an ultrasonic wave along a path in which are placed a series of thin film reflectors 23, 25, 27 and 29 respectively. These films may, for example, be formed of an aluminized polyester film. If the film is substantially less in thickness than one-quarter of a wavelength of the ultrasonic wave, then the reflection coefficient will be controlled by both the material and the thickness, thereby allowing a relatively small reflection coefficient, less than 0.10, to be provided. For example, if the frequency of the ultrasonic pulse were 10 megahertz, a thickness of about 0.001 inch would appropriate. Since the effective impedance seen at normal incidence depends on both the plate thickness and the ratio of the characteristic impedances of plate to fluid medium, the greater the ratio of characteristic impedances, the thinner the plate must be, compared to wavelength, to maintain an $R$ sufficiently small to interrogate many sensor regions. In the embodiment illustrated in FIG. 5 the ultrasonic transducer 21 is positioned within the fluid medium to emit a beam of ultrasonic energy toward the series of plates 30 to 39. These plates may be rectangular plates or disks positioned at intervals throughout the medium corresponding to the discrete sections of the medium over which it is intended to measure the profile of temperature or some other ambient condition with which ultrasonic transmission characteristics vary. Each plate is characterized by having a central opening 30$a$, 31$a$, etc., with the openings decreasing in size in a progression away from the transducer. Thus the opening 30$a$ in plate 30 is larger than the opening 31$a$ in plate 31, which in turn is larger than the opening in the next successive plate. Provided that the transverse cross section of the beam of ultrasonic energy from transducer 21 is larger than the opening 34, such an arrangement will provide that some ultrasonic energy is reflected from each one of the plates. By arranging the size of the openings and the gradation in these openings properly with respect to this cross section of the ultrasonic beam, the effective reflective coefficient from each reflector may be arranged to be less than 0.10, thereby providing that substantially uniform amounts of reflected ultrasonic energy are retransmitted back to the transducer 21. Alternatively, the openings 30$a$, 31$a$, etc., may all be the same size, the reflection from plates in the series being achieved by slight misalignment of the openings.

Figure 6:
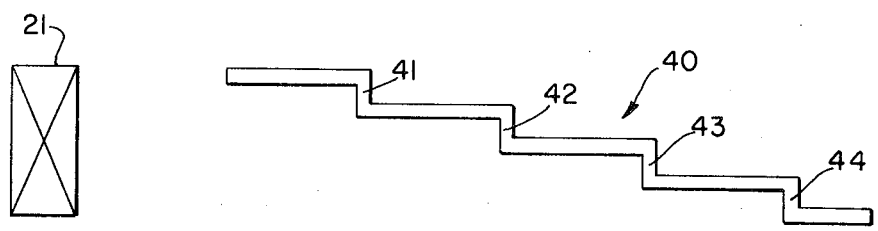
FIG. 6 is an illustration in diagrammatic form of another embodiment of a sensor element useful in the practice of this invention.

In FIG. 6, the cross section of the ultrasonic beam from the transducer 21 is made larger than the effective transverse dimension of the series of steps forming the element 40 and, once again, the effective reflection coefficient as a portion of the total beam is a product of both the difference in acoustic impedances of the medium and the material forming the staircase member 40 and also the ratio of the dimension of the transverse surfaces of each step to the cross-sectional dimension of the ultrasonic beam.

Figure 7:
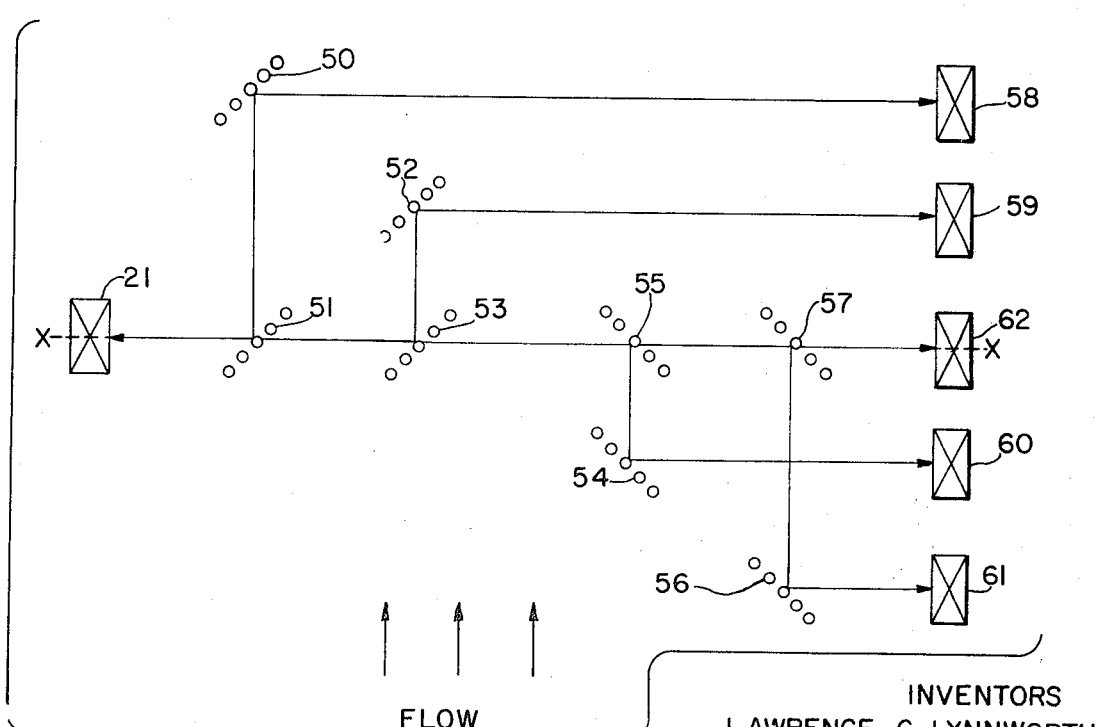
FIG. 7 is an illustration of an embodiment of the sensors useful for the measurement of two different parameters of a physical medium.

FIG. 7 illustrates a system which provides for profile measurement along a coordinate, where two conditions affect the acoustic propagation characteristics of the fluid. The system permits measurement of both temperature and flow velocity along the coordinate X—X.

The transducer 21 emits a beam of ultrasonic waves along this coordinate directed toward a series of mesh plates or screens 51, 53, 55 and 57. As in the embodiments illustrated in FIG. 3 the mesh size is controlled to effect, in combination with the impedance ratio between the screen material and the fluid, a reflection coefficient of less than 0.10. The first screen 51 is angled to reflect the ultrasonic wave in a direction orthogonal to the coordinate X—X to strike an offset reflective screen 50, which is angled to reflect the incident wave to a second transducer 58. The reflection characteristic of the screen 50 is not critical, it being generally desirable to maximize the amount of reflection without, however, unduly disturbing the fluid flow.

In similar fashion ultrasonic waves reflected from screen 53, strike reflector 52 and are detected at transducer 59. Screens 55 and 57 are, however, angled in the opposite direction to reflect ultrasonic waves incident on them in the opposite direction to reflectors 54 and 56 respectively and thence to transducers 60 and 61. That portion of the beam not reflected from any of the screens 51, 53, 55 and 57 is transmitted to transducer 62.

The transit time, therefore, of the ultrasonic waves from the transmitting transducer to initial reflector to its offset reflector and to its receiving transducer provides a measurement of the combined effects over such discrete intervals of both the temperature of the medium and velocity of flow. Each transducer is arranged to both transmit and receive and hence the difference in transit time for ultrasonic pulses traveling in one direction from the transit time for pulses traveling in the opposite direction provides an indication of flow velocity, while the average transit time is indicative of temperature. Any difference between the transit times for waves transmitted from transducer 21 to transducer 62 and the transit time for waves transmitted in the opposite direction indicates a component of flow other than normal to axis X—X and this factor may be used to correct the other measurements. In order to measure a transit time difference, $t_1 - t_2$, the transit time, $t_1$, between the "main bang" at transducer 21 and each of the transducers 58, 59, 60, 61 and 62, may be determined by gating a measuring device from each of the receiving transducers. To measure the transit times, $t_2$, in the opposite direction, each of the transducers 58, 59, 60 and 61 may be pulsed in a programmed sequence and the output from transducer 21 gated according to that program.

Figure 8:
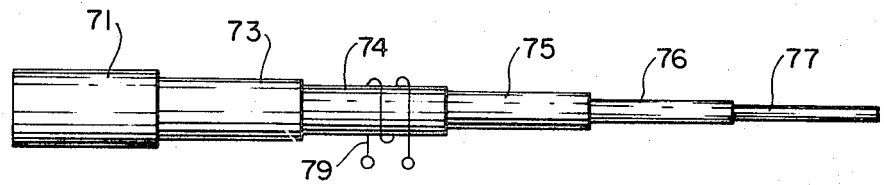
FIG. 8 is an illustration generally in schematic form of one embodiment of a bidirectional sensor constructed in accordance with the principles of this invention.
Figure 9:
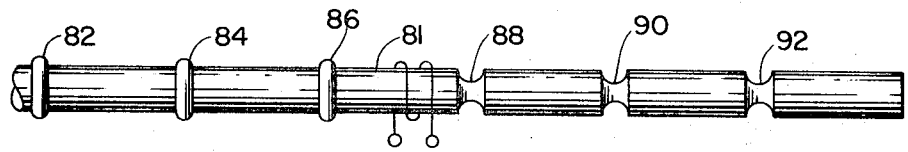
FIG. 9 is an illustration generally in schematic form of a second embodiment of a bidirectional sensor constructed in accordance with the principles of this invention.

The solid sensors illustrated in FIGS. 8 and 9 provide bidirectional profiles, the polarity of the reflection pulses indicating whether they originated in the right or left portion of the sensor. In FIG. 8 the sensor is formed of successively smaller diameter cylindrical sections 71 through 77. The transmitter-receiver coil 79 is located on section 74 near the right-hand end of this section. Ultrasonic waves transmitted to the left are reflected from discontinuities having a positive reflection coefficient, while those transmitted to the right are reflected from discontinuities exhibiting negative reflection coefficients. The coil 79 is located off center in section 79 so that negative pulses from the right-hand sections do not coincide with and thus cancel at the receiver positive pulses from left-hand sections.

A second configuration of a bidirectional sensor is illustrated in FIG. 9. In this embodiment the negative reflections are generated by notches 88, 90 and 92, while the positive reflection pulses are generated by mushroom welds used to generate rings 82, 84 and 86 of increased diameter. In both embodiments the reflection coefficients should again be no greater than 0.10.

Figure 10:
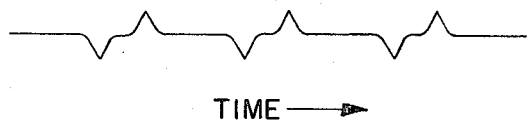
FIG. 10 is a diagram in graphical form illustrating the signals sequence from the sensors of FIGS. 9 and 10.
Figure 11:
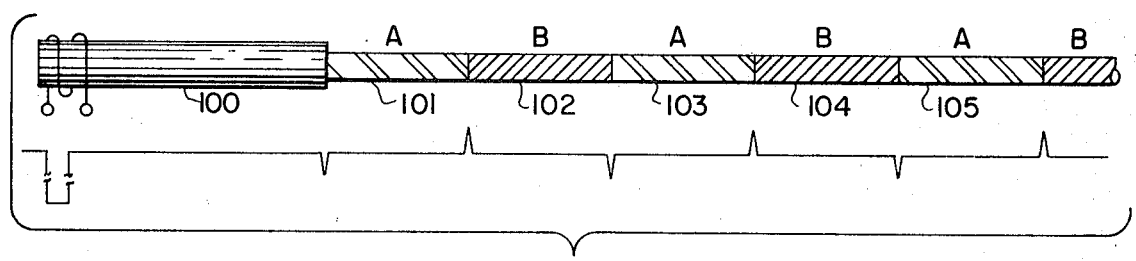
FIG. 11 is an illustration in schematic form of yet another embodiment of a sensor element useful in the practice of this invention.

The waveform illustration of FIG. 10 shows the response of the sensors of both embodiments, with the pulses being in idealized form. In FIG. 11, iterated sensors are constructed all of one diameter, the small reflections being achieved by choosing materials $A$ and $B$ of characteristic impedances only slightly different from one another, typically within 20 percent, to keep $R<0.1$. Assuming $Z_B$ slightly greater than $Z_A$ ($1.1Z_AZ_B<1.2Z_A$), the echoes will alternate in polarity, but will be of like magnitude. Both materials need not necessarily respond to the same physical parameter. One material might measure temperature; the other, nuclear fluence, primarily. Since the sensors are all of like diameter, the reflection coefficients between sensors would be essentially equal, for both extensional and torsional waves, for $A$ and $B$ with Poisson's ratios not too different from one another. For example, $A$ may be tungsten, $B$ rhenium. The transducer 100 can be operated as a Joule effect device for extensional waves, when biased axially, or as a Wiedemann effect device for torsional waves, when biased circumferentially by being pulsed electrically with an axial current.

Another form of sensor employing a single diameter rod utilizes a rod with a series of bends therein, to form the discontinuities, the radius of curvature of each bend being approximately equal to the wavelength of the ultrasonic pulse.

While, in the above descriptions, the path for the ultrasonic beam has been depicted as a straight one, it need not be so. Curved paths and other irregular paths may be employed provided that the ultrasonic beam is appropriately guided or beamed and that the principles governing the positioning and reflectance of the reflectors are adhered to.

While the above discussion refers to "pulses" it is to be understood that $rf$ bursts could be employed in some circumstances, the center frequency of said bursts being adjusted so that the reflectors' lengths would be resonant, or nearly so, to provide the desired small reflectance appropriate to measuring many iterated sensors in series.

What is claimed is:

1. Apparatus for measuring variations in ultrasonic transmission characteristics in a medium over a series of discrete intervals along a predetermined path as indicative of the value over a range of values of an ambient condition affecting ultrasonic transmission characteristics comprising,
   a transducer for generating ultrasonic waves and for generating output electrical signals in response to received ultrasonic waves,
   a series of at least three sensor elements formed by ultrasonic discontinuities spaced at discrete equal intervals along said path, the acoustic impedances of said discontinuities being substantially identical and of a relative value such that the acoustic reflection coefficient for each discontinuity for ultrasonic waves traveling in a first direction is no greater than 0.1 over said range of values of said ambient condition; and
   said transducer being positioned to transmit generated ultrasonic waves along said path and to receive ultrasonic waves reflected from said sensor elements and provide an output signal indicative of the time separation between reflections from successive ones of said reflection elements.

2. Apparatus in accordance with claim 1 wherein said reflection elements are formed of ultrasonic discontinuities in a solid cylindrical member extending along said path, said cylindrical member having a diameter substantially less than the wavelength of said generated ultrasonic waves, said transducer being coupled to one end of said solid cylindrical member.

3. Apparatus in accordance with claim 2 wherein said ultrasonic discontinuities are formed of changes in diameter of said solid cylindrical member.

4. Apparatus in accordance with claim 2 wherein said solid cylindrical member is of substantially constant diameter.

5. Apparatus in accordance with claim 4 wherein said solid cylindrical member is formed of equal length segments of alternately first and second material, the acoustic properties of each of said first and second materials being such as to provide at each material interface reflection coefficients no greater than 0.10.

6. Apparatus in accordance with claim 5 wherein said first material is tungsten and said second material is rhenium.

7. Apparatus in accordance with claim 4 wherein each discontinuity is formed of a bend in said element of radius approximately equal to the wavelength of said generated ultrasonic waves.

8. Apparatus in accordance with claim 3 wherein said transducer is positioned between two of said sensor elements, said ultrasonic discontinuities being arranged such that the reflection coefficient of any of said discontinuities in sensors on one side of said transducer has the opposite polarity from the reflection coefficient of discontinuities in sensors on the opposite side of said transducer.

9. Apparatus in accordance with claim 8 wherein said sensors are formed of a series of cylindrical elements, the diameter of each cylindrical element in said series being smaller than the diameter of the preceding element in said series.

10. Apparatus for measuring variations in ultrasonic transmission characteristics in a fluid medium over a series of discrete intervals along a predetermined path as indicative of the value over a range of values of an ambient condition affecting ultrasonic transmission characteristics,
    a transducer for emitting a beam of ultrasonic waves along said predetermined path and for producing in response to received ultrasonic waves output electric signals;
    a series of at least three reflection elements spaced at discrete equal intervals along said path within said fluid medium, each of said reflection elements being formed to reflect a portion of said ultrasonic beam back toward said transducer, the effective reflection coefficient for each of said reflection elements being substantially the same and less than 0.10; and
    means responsive to the electrical signals produced by said transducer to provide output signals indicative of the time separation between reflections from successive ones of said reflection elements as indicative of the ultrasonic transmission characteristics in each of said series of discrete intervals.

11. Apparatus in accordance with claim 10 wherein each of said reflection elements are independent from one another.

12. Apparatus in accordance with claim 10 wherein each of said reflection elements are substantially identical in form and composition.

13. Apparatus in accordance with claim 10 wherein said reflection elements are formed of a series of solid reflection surfaces, each of said surfaces extending normal to said path and transverse of said ultrasonic beam, each of said solid reflection surfaces being interconnected to form a stepped element, the total dimension of said stepped element in a direction transverse of said ultrasonic beam being less than the cross-sectional dimension of said ultrasonic beam.

14. Apparatus in accordance with claim 11 wherein each of said elements is formed of a polyester film, the thickness of said polyester film being substantially less than one-fourth the wavelength characteristic of said emitted ultrasonic beam.

15. Apparatus in accordance with claim 11 wherein each of said reflection elements is formed of a mesh screen.

16. Apparatus in accordance with claim 11 wherein each of said reflection elements is formed of a plate member extending in a direction transverse of said ultrasonic beam, each of said plate members being formed with an opening therethrough, the openings in successive ones of said plates being such as to reflect substantially the same proportion of ultrasonic waves incident thereon to provide said substantially uniform pulse heights at said transducer from ultrasonic waves reflected from each of said plates.

17. Apparatus in accordance with claim 16 wherein the openings in successive ones of said plates are successively smaller.

18. Apparatus as in claim 10 wherein each of said elements is formed of a thin metal plate, the thickness of the plate in fractional wavelength being less than the ratio of the characteristic impedance of the fluid to that of the plate.

19. Apparatus for measuring variations in ultrasonic transmission characteristics as in a flowing fluid medium over a series of discrete intervals along a predetermined path normal to the direction of flow as indicative of the velocity of flow and the value of another ambient condition affecting the ultrasonic transmission characteristics comprising, a first transducer for emitting a first beam of ultrasonic waves in a first direction along said predetermined path, and for providing output electrical signals in response to received ultrasonic waves, a series of at least three reflection elements spaced at said discrete intervals along said said path, each of said reflection elements being formed to reflect a portion of said beam in a direction parallel to the direction of flow of said fluid, the effective reflection coefficient for each of said reflection elements being less than 0.10, a plurality of second transducer means positioned to receive the ultrasonic waves from said first beam reflected from said reflection elements and provide output electrical signals in response thereto, said second transducers emitting a plurality of ultrasonic beams in a second direction opposite to said first direction to strike each of each of said reflection elements and be reflected back to said first transducer, and means responsive to said output electrical signals to provide for each of said discrete intervals an indication of the ultrasonic transmission characteristics and of the flow velocity.

* * * * *

UNITED STATES PATENT OFFICE
CERTIFICATE OF CORRECTION

Patent No. 3,636,754　　　　　　　　Dated January 25, 1972

Inventor(s) Lawrence C. Lynnworth, Dana R. Patch and Edmund H. Carnevale

It is certified that error appears in the above-identified patent and that said Letters Patent are hereby corrected as shown below:

Column 1, lines 31-33 reading

"have been described in applications Ser. No. 730,713 filed May 21, 1968 and Ser. No. 730,872, filed May 21, 1968, now U.S. Pat. No. 3,580,058, both assigned to the assignee of this"

should read

--have been described in applications Ser. No. 730,713 filed May 21, 1968, now U.S. Pat. No. 3,580,058 and Ser. No. 730,872, filed May 21, 1968, now U.S. Pat. No. 3,540,265, both assigned to the assignee of this--

Column 2, line 39 reading

"through the openings in the mesh ans hence does not interact"

should read

--through the openings in the mesh and hence does not interact--

Column 4, line 13 reading

"$R+r-1/r+1,$"

should read

--$R=r-1/r+1,$--

UNITED STATES PATENT OFFICE
CERTIFICATE OF CORRECTION

Patent No. 3,636,754              Dated January 25, 1972

Inventor(s) Lawrence C. Lynnworth, Dana R. Patch and Edmund H. Carnevale

It is certified that error appears in the above-identified patent and that said Letters Patent are hereby corrected as shown below:

Column 4, lines 30-31 reading

"In a specific numeral example, if the impedance ratio $r = \frac{11}{9} = 1.2222$, then the reflection coefficient T=0.10 and the trans"

should read

--In a specific numerical example, if the impedance ratio $r = \frac{11}{9} = 1.2222$, then the reflection coefficient R=0.10 and the trans Signed and sealed this 26th day of September 1972.

(SEAL)
Attest:

EDWARD M. FLETCHER, JR.
Attesting Officer

ROBERT GOTTSCHALK
Commissioner of Patents